Dec. 22, 1942.   J. WIMMER   2,305,821
PROCESS FOR PRODUCING CARBON TETRACHLORIDE
Filed Oct. 1, 1938
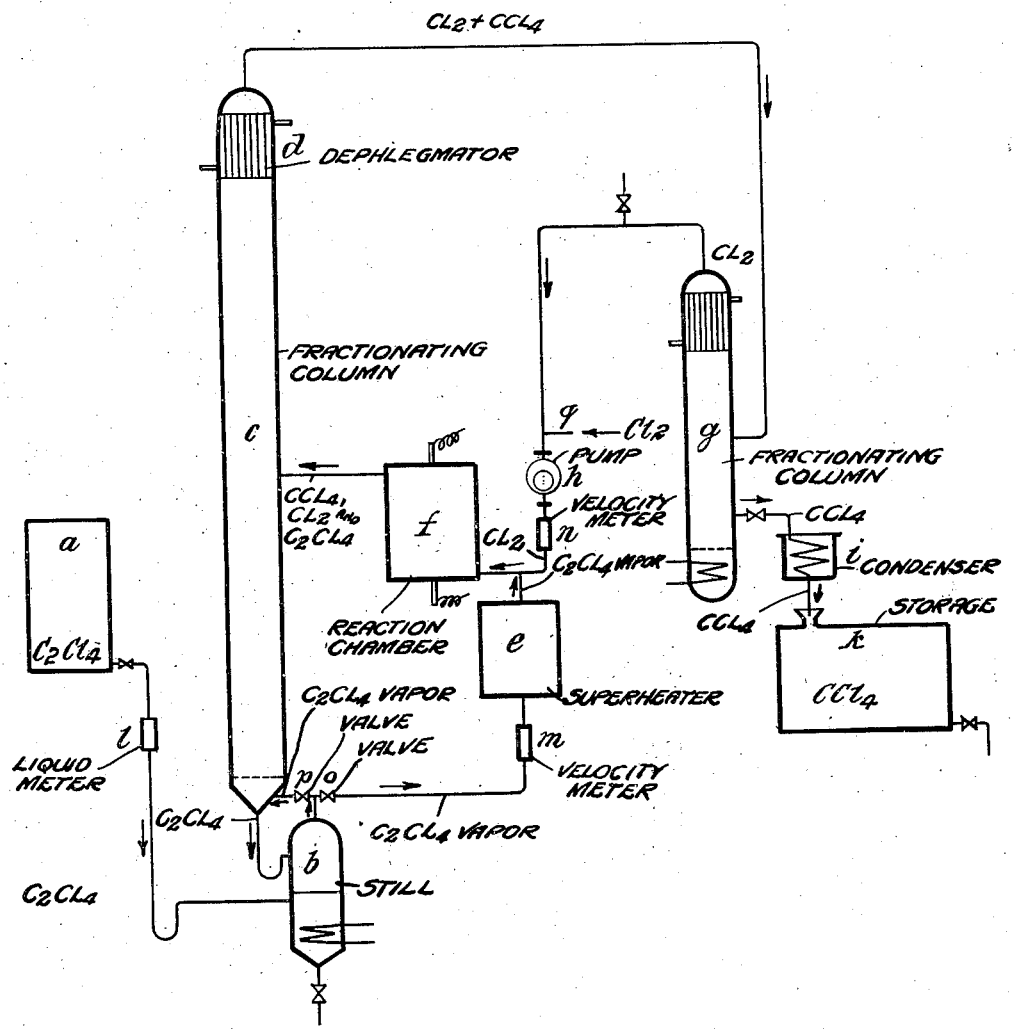
INVENTOR
BY JOSEF WIMMER
Sager & Malcolm
ATTORNEYS Patented Dec. 22, 1942

2,305,821

UNITED STATES PATENT OFFICE 2,305,821

PROCESS FOR PRODUCING CARBON TETRACHLORIDE

Josef Wimmer, Burghausen, Bavaria, Germany; vested in the Alien Property Custodian Application October 1, 1938, Serial No. 232,824
In Germany October 4, 1937

7 Claims. (Cl. 260—658)

This invention relates to the production of carbon tetrachloride and has for its object to provide a new and improved process for this purpose.

It is known that at high temperatures there is an equilibrium between chlorine, perchlorethylene and carbon tetrachloride, which may be expressed by the equation:

Experiments have already been made with the object of producing perchlorethylene by heating carbon tetrachloride to a high temperature. (Journal of Phys. Chemistry 1919, 23, p. 415). However, it was found that hexachlorethane was also generated along with hexachlorbenzol in considerable quantity, which had a very disturbing effect on these experiments.

The object of the present invention is to prepare carbon tetrachloride by performing the counterreaction:

The process heretofore used for the production of carbon tetrachloride has had as its source a cheap carbon, charcoal. However, since the carbon is first transformed into carbon bisulphide and as the precipitated sulphur must always be returned to the operation, the process is discontinuous and complicated. It leads to an impure carbon tetrachloride, which must still be subjected to a process of purification to remove traces of sulphur compounds. The advantage obtained from the cheap raw material is largely lost by these unfavorable circumstances.

In contrast to the unsatisfactory previous process referred to above, my invention provides a continuous process which requires no auxiliary substances and only very slight supervision, and yields very pure carbon tetrachloride in a single operation. According to my process perchlorethylene vapor and chlorine are simultaneously passed through a chamber heated to 700°–800° C. The perchlorethylene is partly split up in this operation, and chlorinated to carbon tetrachloride. The vapors containing a heavy charge of carbon tetrachloride are conducted to the top of a continuously operating fractionating column provided with a dephlegmator and a heatable still, in which the chlorine and the carbon tetrachloride are separated from the perchlorethylene immediately after their entrance into the column, before appreciable amounts of the perchlorethylene can combine with chlorine to form hexachlorethane.

The perchlorethylene is again conducted from the still into the heating zone, with the addition of an amount of perchlorethylene equal to that used up in the reaction. Throughout the process, therefore, a current of perchlorethylene vapor continuously circulates through a heating chamber simultaneously traversed by chlorine, and through the lower part of a fractionating column. The quantitative amounts of the chlorine and the perchlorethylene in the heating zone may be maintained with variations in the quantity of either substance. The most favorable reaction temperature lies between 700° and 800° C. in the absence of a catalyst. Above 850° a considerable amount of hexachlorbenzol forms, which naturally has an unfavorable effect upon the output of carbon tetrachloride. In our process, hereinafter described in detail, hexachlorethane forms in only a small quantity, and therefore no clogging occurs. In point of fact, the hexachlorethane would likewise form carbon tetrachloride in the reaction zone, and would not, therefore, entail a loss, but the formation of hexachlorethane should be avoided for the reason that its chlorination to carbon tetrachloride is an endothermic reaction and would use up heat required in the reaction zone. On the other hand the chlorination of the perchlorethylene to carbon tetrachloride occurs exothermically. The quantity of heat required in the production of carbon tetrachloride in small quantities may be considerably reduced by preheating the perchlorethylene vapor.

The accompanying drawing shows diagrammatically one embodiment of the process. The perchlorethylene is vaporized in still $b$. The perchlorethylene vapor is conducted through valve $o$ and velocity meter $m$ into superheater $e$ and thence into the reaction chamber $f$. The reaction chamber $f$ is heat insulated, and is lined with a carbon electrode by means of which it is heated to 700–800° C., chlorine being admitted to the reaction chamber from $n$. The vapors flow from $f$ to the center of the elongated fractionating column $c$ equipped with a dephlegmator $d$. The separation of the carbon tetrachloride and the chlorine from the untransformed perchlorethylene, which returns to still $b$, takes place in this column. An additional amount of the perchlorethylene vapor from still $b$ is conducted directly into column $c$ through valve $p$, to air in effecting the separation in said column. Perchlorethylene is allowed to flow into the still $b$ from receptacle $a$ through liquid meter $l$, in an amount corresponding to the generated carbon tetrachloride.

The vapors emanating from the dephlegmator $d$ pass to the fractionation column $g$, which effects the separation of the carbon tetrachloride from the chlorine. The carbon tetrachloride which evaporates from the sump of this column is condensed in $i$ and stored in collector $k$. The chlorine leaving column $g$ is driven by pump $h$ over the velocity meter $n$ into the reaction chamber $f$. At $q$ fresh chlorine is admitted into the system in the measure of its consumption.

The apparatus shown in the drawing represents only one of the possible embodiments of the process. Instead of circulating the chlorine as in the process described above, it is also possible to operate only with fresh chlorine, in which case the chlorine gas containing carbon tetrachloride may be subjected to a low temperature separating operation. The traces of carbon tetrachloride still found in the chlorine gas can then be collected or used as desired.

The following results, for example, were obtained with the system described above, and operating without preheating: 160 parts of perchlorethylene were passed per hour from still $b$ to the heating chamber $f$, together with 260 parts of chlorine. The temperature of the heating chamber $f$ was maintained at 725° C. 123 parts of carbon tetrachloride were obtained per hour. The liquid level in $b$ was kept constant with a continuous supply of perchlorethylene. During the entire operation the boiling point of the contents of the still did not rise above 119° C., the boiling point of pure perchlorethylene. There was in the still a quantity of hexachlorethane amounting to only 1.4% of the total carbon tetrachloride obtained. Hexachlorbenzol or other by-products were not formed in any appreciable amount. The yield, therefore, was practically quantitative. When the operation was performed at 850° C. under the same conditions, the formation of hexachlorbenzol rose to 2.5% of the carbon tetrachloride, without the output of carbon tetrachloride having been increased, which was not to be expected in view of the exothermal course of the reaction. Carbon-like compounds appeared in the heating chamber, which were absent when the process was performed at the lower temperatures referred to above. Although no preheating was used, the energy consumption in the heating zone was less than one-half kw/h per kilogram of carbon tetrachloride. Calculated per litre of heating space, the hourly production of carbon tetrachloride was about 1 kilogram.

The invention claimed is:

1. Process for producing carbon tetrachloride which comprises reacting perchlorethylene and a considerable excess of chlorine at a temperature of 700—800° C.

2. Process for producing carbon tetrachloride which comprises reacting perchlorethylene and a considerable excess of chlorine at a temperature of 700°—800° C., and subjecting the reaction product to fractionation.

3. Process for producing carbon tetrachloride which comprises reacting perchlorethylene and a considerable excess of chlorine at a temperature of 700°—800° C., subjecting the reaction product to fractionation to separate the carbon tetrachloride and the unreacted chlorine from the perchlorethylene, and then separating the carbon tetrachloride from the chlorine.

4. Process for producing carbon tetrachloride which comprises reacting perchlorethylene and a considerable excess of chlorine at a temperature of 700°—800° C., subjecting the reaction product to fractionation to separate the carbon tetrachloride and the unreacted chlorine from the perchlorethylene, separating the carbon tetrachloride from the chlorine by fractionation, and returning the chlorine to the reaction.

5. Process for producing carbon tetrachloride which comprises reacting perchlorethylene and a considerable excess of chlorine at a temperature of 700°—800° C., subjecting the reaction product to fractionation to separate the carbon tetrachloride and the unreacted chlorine from the perchlorethylene, separating the carbon tetrachloride from the chlorine, and returning the unreacted perchlorethylene and chlorine to the reaction.

6. Process for producing carbon tetrachloride which comprises reacting perchlorethylene and a considerable excess of chlorine at a temperature of 700°—800° C., subjecting the reaction product to fractionation to separate the carbon tetrachloride and the unreacted chlorine from the perchlorethylene, separating the carbon tetrachloride from the chlorine, returning the unreacted perchlorethylene and chlorine to the reaction, and continuously recirculating the original reactants.

7. Process for producing carbon tetrachloride which comprises continuously reacting perchlorethylene vapor and a considerable excess of chlorine at a temperature of 700—800° C., continuously passing the resulting reaction mixture containing carbon tetrachloride to the center of a fractionating column to separate the carbon tetrachloride and the untransformed chlorine from the perchlorethylene, and continuously recirculating the perchlorethylene vapor and the untransformed chlorine through the heating zone and the fractionating column while adding thereto quantities of the original reactants equivalent to those used up in the reaction.

JOSEF WIMMER.